United States Patent [19]
Nixon

[11] Patent Number: 4,644,407
[45] Date of Patent: Feb. 17, 1987

[54] DISPLAY SYSTEMS

[75] Inventor: Ralph D. Nixon, Braintree, England

[73] Assignee: English Electric Valve Company Limited, Chelmsford, England

[21] Appl. No.: 668,852

[22] Filed: Nov. 6, 1984

[30] Foreign Application Priority Data

Nov. 22, 1983 [GB] United Kingdom ............... 8331113

[51] Int. Cl.$^4$ ............................................. H04N 7/18
[52] U.S. Cl. .................................... 358/242; 358/113; 358/160
[58] Field of Search ................ 358/140, 242, 113, 160

[56] References Cited

U.S. PATENT DOCUMENTS 4,520,391 5/1985 Edgar ................................... 358/242

Primary Examiner—Howard W. Britton
Attorney, Agent, or Firm—Spencer & Frank

[57] ABSTRACT

A display arrangement particularly suitable for displaying video signals representing a thermal image. Successive horizontal lines of a television raster pattern are offset, or staggered, by a small amount so as to remove vertical stripe patterns which are caused by digital processing and storage of the video signal. This results in a much more acceptable visual display.

4 Claims, 2 Drawing Figures

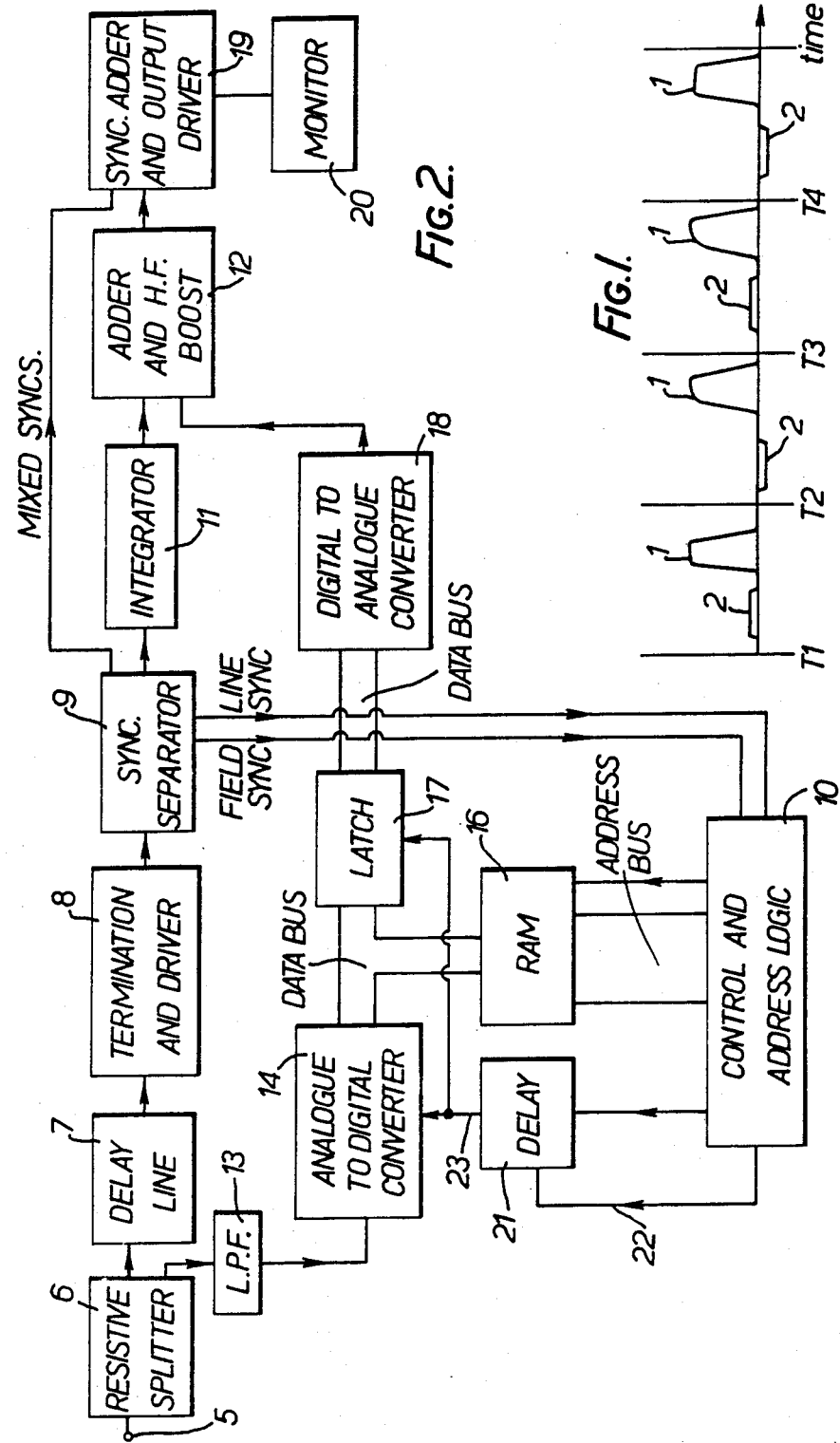

_4,644,407_

DISPLAY SYSTEMS

BACKGROUND OF THE INVENTION

This invention relates to display systems, and is particularly applicable to such systems in which the displayed information is derived from video data in a digital format. The invention can advantageously be used with a thermal imaging arrangement.

The invention seeks to provide an improved display system and an improved method of displaying video information.

SUMMARY OF THE INVENTION

According to a first aspect of this invention, a method of processing video information for display includes the steps of producing video signals which are at least partly derived from digital data elements so that the video signal is arranged as a succession of line scan signals; and staggering the relative line scan positions of at least those displayed line scan signals which relate to the digital data elements so that picture points in successive line scan signals do not align to form a pattern of stripes normal to the line scan direction.

The two steps need not necessarily be performed in the order stated as the generation of the digital data elements may itself include the stagger contribution.

When a video signal is derived from digital data elements, the use of a regular data clock signal either to generate or read out the digital data produces a corresponding regular array of displayed picture points. This can result in a visually disturbing pattern of "vertical stripes" if the resolution in the horizontal direction is worse than the resolution in the vertical direction. The terms horizontal and vertical are used by analogy with the normal operation of a television-like display arranged in a raster line scan format in which the line scan direction is horizontal and the field direction is vertical. In a conventional television system the resolution in the line direction is arranged to be about the same as that in the field direction.

The invention is particularly applicable to a flicker suppression system in which analogue video signals are sampled to produce a succession of digital values so as to facilitate subsequent processing in conjunction with following fields of information. Preferably the sampling clock signals are varied from line scan to line scan to produce the necessary staggering in the line direction. Flicker is a visual effect which is often present in thermal imaging systems in which the video signal represents the heating and cooling of a periodically shuttered heat sensitive target. As the polarity of the video signal during a heating image phase is the opposite of that during a cooling phase, successive video line signals are inverted to form a coherent picture, but this emphasises the presence of permanent or varying imperfections in the system, as these imperfections give rise to unwanted variations in the video signal level, which cause the undesirable flicker. Digital processing of the video signals to suppress this flicker causes the vertical stripe pattern which stems directly from the artificial regularity of the picture points which are caused by the digital nature of the signal processing. By staggering the lateral positions of successive line scans the vertical stripes disappear, and any residual pattern is quite unobtrusive.

According to a second aspect of this invention, a display system includes means for receiving a video signal which is in a frame and line format and which incorporates an unwanted signal component recurring at the frame frequency; digital processing means for digitally processing the video signal so as to remove the unwanted signal component; and means for producing relative shifts in the timing signals of said digital processing means so as to suppress the display of unwanted vertical stripe patterns originating with the digital processing.

According to a third aspect of this invention a display system includes means for receiving an analogue video signal which is in a frame and line format and which incorporates an unwanted signal component recurring at the frame frequency; means for converting the video signal on a frame-by-frame basis into a succession of digital samples and storing them, the clock signal which determines the sampling means being staggered by half a clock period for alternate line scan periods; and means for converting the stored digital signal back into an analogue signal which is combined with a signal derived from said received analogue video signal so as to substantially cancel said unwanted signal component.

BRIEF DESCRIPTION OF THE DRAWINGS

The invention is further described by way of example with reference to the accompanying drawings in which:

FIG. 1 is an explanatory diagram illustrating a video waveform, and

FIG. 2 is a block diagram of a display system in accordance with the invention.

DESCRIPTION OF THE PREFERRED EMBODIMENT

Referring to FIG. 1 there is shown therein a video waveform representing four successive frames of a thermal imaging system. The video signal is derived from a thermal camera which views an external scene via a shutter arrangement which periodically and regularly obscures the field of view. This ensures that the camera does not see a constant temperature, but its heat sensitive target at which the thermal image is formed is alternately heated and cooled. It is necessary to shutter the camera as the thermally sensitive target provides an output signal only in response to portions of the scene which have changing temperatures. A consequence of this shuttering process is that the wanted video signal has alternate polarities for successive frames, and consequently it is necessary to invert alternate frames of video information to produce a video signal which drives a monitor. In principle, this is a satisfactory arrangement, but in practice the thermal camera, and particularly the heat sensitive target, invariably possess minor blemishes and non-linearities which cause unwanted perturbations in the video signal, which occur at the frame repetition rate. Inversion of alternate frames of video information so as to cause the wanted signal excursions to have the same polarity causes the unwanted minor variations in the video signal to add in such a sense as to cause an objectional visual flicker when the video signal is displayed on a monitor.

A video signal in which this effect is present is illustrated in FIG. 1 in which successive frame periods commence at instants T1, T2, T3 and T4. It is assumed that there is a relatively large hot object in the field of view having a temperature which differs greatly from its surroundings and which gives rise to the large excursion of the video signal represented at 1 in each frame period. In this drawing, the waveforms are inverted in alternate frame periods so that the excursion 1 has the same polarity in all frames. The blemishes and non-linearities of the thermal camera system give rise to the signal excursion 2 in each frame period and it will be seen that the necessary inversion of the video signal in alternate frame periods also causes inversion of the signal excursion 2. Although the signal excursions 1 and 2 have been shown occurring in mutually exclusive periods of time, in fact, of course, the two signal components are likely to be superimposed on each other.

It has been found that the alternating polarity of the signal portion 2 gives rise to a very significant and objectional visual flicker which can readily be removed by simple digital processing. As will be explained with reference to FIG. 2, the digital processing gives rise to a different objectionable visual effect which stems from the available horizontal resolution of the digital signal, and it is the purpose of this invention to remove, or at least reduce, these visual effects.

Referring to FIG. 2, a video signal of the kind illustrated in FIG. 1 is received at terminal 5 (it also includes the necessary conventional line and frame synchronising signals). The video signal is applied to a resistive splitter 6 which separates the signal into two identical parts, one part of which is fed via a delay line 7, a termination and driver circuit 8 to a sync.separator 9. The delay line 7 merely compensates for processing delays to which the other part of the video signal is subjected. The termination and driver circuit 8 reforms the video signal and provides any necessary power boost. At the sync. separator 9, the line and field synchronisation signals are removed from the video signal and are routed to a control and address logic circuit 10 which generates the necessary timing information for the digital part of the circuit. The video information itself is fed via an integrator 11 (which includes a low-pass filter), to a video signal adder 12.

The other part of the video signal is fed from the resistive splitter 6 via a low-pass filter 13 to an analogue-to-digital converter 14. The analogue video signal is repetitively sampled under the control of a clock signal fed over line 23 from the control and address logic circuit 10 to produce a sequence of discrete digital samples, each digital sample being encoded into an 8-bit word which is stored in a random acess memory (RAM) 16. The capacity of the memory 16 will depend upon the number of lines in a frame and on the resolution required. For a typical television-like picture, it will be necessary to provide four memory devices, each being able to store 8K digital words, each word being of 8 bits. As memories of this kind are relatively expensive as compared with the other circuit components, it is necessary to keep the number of memory devices to an absolute minimum.

The information is held in the memory 16 for one frame period and is then read-out into a latch 17 word by word under the control of the clock pulses. Simultaneously, the next frame of information is entered word by word into the memory 16 from the converter.

The output of the latch is converted to an analogue signal precisely in step with the succeeding analogue signal passing along the analogue path 6,7,8,9,11 and is combined with it in the adder 12 in such a polarity as to cancel those portions of the waveform represented diagramatically by excursions 2 in FIG. 1, thereby leaving a flicker-free signal at the output of the adder 12. Typically, the adder 12 includes a high frequency boost signal to compensate for the action of the integrator 11, whose presence is necessary to equalise the frequency responses of the digital and analogue paths.

The synchronisation signals which were extracted at the sync. separator 9 are re-inserted at a sync. adder circuit 19 which also includes an appropriate amplifier so as to provide a suitable output signal which is displayed on a monitor 20. Of course, the monitor 20 may be at a remote location to which the output signal is transmitted either by cable or radiation.

Because the digital information is held in the memory 16 which has only a limited capacity, the horizontal resolution of the subtraction signal is relatively coarse and this would give rise to marked visual vertical stripes in the picture which is displayed on a monitor.

These vertical stripes can be quite distracting and render interpretation of the displayed image fairly difficult. A switchable delay circuit 21 is positioned in the clock signal path between the control and address logic circuit 10 and the analogue-to-digital converter 14. This delay circuit has a delay of half a clock period; that is to say, of the clock period which represents the sampling period of the analogue-to-digital converter. The delay period provided by the delay circuit 21 is switchable under the control of a signal applied via line 22 so that the delay circuit alternately exhibits a delay of half a clock period and zero delay. Thus, on alternate line scans, the clock signal which clocks the converter 14 and the latch 17 is not subject to any delay, but on the remaining alternate lines it is delayed by half a clock period.

As alternate line scans which are held in the memory 16 are thus staggered by half a clock period, the subtracted signal which is output from the latch 17 does not give rise to a vertical stripe pattern, but instead the picture points appear to be largely randomly distributed. The picture points are, in effect, vertically interlaced from line to line, doubling the frequency and halving the amplitude of the vertical stripe component.

I claim:

1. A display system including means for receiving a video signal which is in a frame and line format and which incorporates an unwanted signal component recurring at the frame frequency; digital processing means for digitally processing the video signal so as to remove the unwanted signal component; and means for producing relative shifts in the timing signals of said digital processing means so as to suppress the display of unwanted vertical stripe patterns originating with the digital processing.

2. A display system including means for receiving an analogue video signal which is in a frame and line format and which incorporates an unwanted signal component recurring at the frame frequency; means for converting the video signal on a frame-by-frame basis into a succession of digital samples and storing them, the clock signal which determines the sampling means being staggered by half a clock period for alternate line scan periods; and means for converting the stored digital signal back into an analogue signal which is combined with a signal derived from said received analogue video signal so as to substantially cancel said unwanted signal component.

3. A system as claimed in claim 2 and wherein a low pass filter is provided to filter the received video signal before it is combined with an analogue signal which is derived from said stored digital signal.

4. A system as claimed in claim 3 and wherein a high frequency boost signal is provided to boost the combined signal to compensate for the action of said low pass filter.

* * * * *